C. SIEBERT.
THERMOMETER.
APPLICATION FILED JUNE 22, 1914.

1,199,121.

Patented Sept. 26, 1916.

Witnesses:
Jean Hickmann.
Johannes Meijer

Inventor:
Carl Siebert.
by Paul A. Schilling
his attorney

UNITED STATES PATENT OFFICE.

CARL SIEBERT, OF CASSEL, GERMANY.

THERMOMETER.

1,199,121.

Specification of Letters Patent.

Patented Sept. 26, 1916.

Application filed June 22, 1914. Serial No. 846,584.

*To all whom it may concern:*

Be it known that I, CARL SIEBERT, a subject of the German Emperor, and residing at Cassel, Germany, have invented certain new and useful Improvements in Thermometers, of which the following is a specification.

The present invention has reference to improvements in thermometers, and relates more particularly to a novel construction of thermometer for measuring minute differences of temperature, of the type known as "differential thermometers;" and the invention essentially resides in the particular construction of such a thermometer, as will be hereinafter fully described, which includes an auxiliary graduated capillary tube communicating respectively with the mercury bulb and the ordinary main capillary tube, the auxiliary capillary tube being of predetermined smaller internal diameter relative to that of the main tube.

With known thermometers of the type referred to such improvements are difficult to effect on account of its being impossible, owing to the relatively large bore of the thermometer tube, to determine accurately the quantity of mercury driven through the upper bent portion of the thermometer tube into the receptacle provided at the top of the tube so as to bring the extremity of the mercury thread to a definite mark within the range of the scale of graduations.

In accordance with the present invention the usual thermometer tube with the ordinary scale for coarse indications, is reduced in bore for some distance adjacent to the mercury bulb while separate adjustment and precision scales are provided to facilitate the performance of accurate temperature measurements.

In order to make the invention more readily understood, I will describe it with reference to the accompanying drawings, in which—

Figure 1:
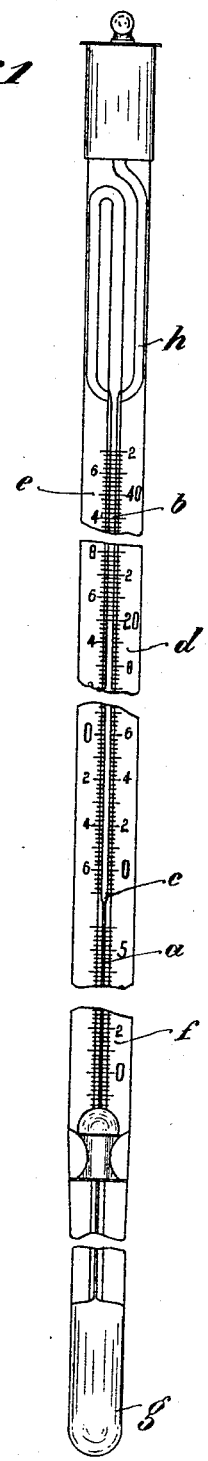
Figure 2:
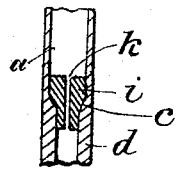

Figure 1 represents a front elevation, partly broken out, of the improved instrument, and Fig. 2 a detail part, in section.

The capillary tube of my thermometer is composed of two communicating parts, of which the lower part $a$ has a smaller bore and communicates with the mercury bulb $g$, and the upper part, with a larger bore $b$ communicates with the bent tube reservoir $h$ which is void of air. To the portion $b$ is applied the scale $d$ affording ordinary indications of temperatures; (a temperature of 20.° being indicated in the drawing). At the junction $c$ of the two portions of the thermometer tube, a separating device is fused into the thermometer tube to facilitate detachment of the upper portion of the mercury thread, such device being constituted, for example by a glass pin $k$—as shown in Fig. 2—having a microscopically small orifice $i$. The lower portion $a$ of the thermometer tube is equipped with a scale $f$ which is the precision scale. The graduation marks of the scale $f$ are spaced farther apart than the corresponding graduation marks of the upper scale $d$ corresponding to the difference in the size of the bores of the respective portions of the tube, so that while the scale $d$ may, for example, be graduated in 1/5 degrees, the scale $f$ may be graduated into 1/50 degrees or even 1/1000 degrees if the bore of the lower portion $a$ of the thermometer tube be made sufficiently small. A second scale $e$ is provided on the upper tube part, which is upwardly displaced relatively to the first scale $d$ a distance corresponding to the exact amount of mercury contained in the lower part of the capillary tube, that is to say from the zero point of scale $d$ downwardly to the zero point of the auxiliary scale $f$ for the precision readings.

In the drawing the graduations are such, that the real temperatures are shown by the scale $d$ in fifths of a degree, and the scale $f$ for precision readings is subdivided in fiftieths of a degree. From zero of the scale $d$ to 2 there are ten parts on the drawing. As this scale is meant to be graduated into fifths of degrees, the thermometer indicates, if the mercury mounts upwardly to the above mentioned 2, ten fifths of a degree, that is two degrees. The numbers on the scale $d$ and therefore also on the scale $e$ mean hereafter whole degrees. As further the scale $f$ is meant to be graduated into fiftieths of a degree and the length 0—2 of the scale comprises 10 parts, the 2 of this scale means 10 fiftieths=0.2°. Obviously, by reducing the diameter of the capillary tube $a$, the graduations may be brought down to as low as thousandths of a degree.

Adjustment of the mercury thread for precise readings is effected by heating the mercury bulb $g$ or by tilting the thermometer until the mercury thread reaches the mark of the scale $e$ indicating the temperature at which it is intended to carry out measurements whereupon the mercury thread is detached by a jerk in known manner, the separation of the thread being insured by the device provided for the purpose. Thereupon the detached portion of the mercury thread is allowed to flow into the receptacle $h$ by laying over the instrument where it is temporarily stored. By inclination of the thermometer in the reverse direction the mercury may subsequently be returned from the receptacle $h$ and be reunited with the thread of mercury.

It will be understood that owing to the adjustment scale $e$ being raised relatively to the scale $d$ to the specified extent the extremity of the residual mercury thread will in all cases fall to the zero mark of the precision scale $f$, which constitutes the basis for subsequent precision measurements additive to or subtractive from the first reading afforded by the scale $d$.

According to the drawing the zero of the scale $e$, it is true, is by 6° higher than the zero of the scale $d$. But this is of no importance whatever, as the graduation must by experiment be fixed in such a manner that the contents of the bore from zero of the scale $e$ to zero of the scale $d$ be equal to the contents from zero of the scale $d$ (or better from the point $c$) to zero of the scale $f$. If for instance at the beginning of the test the upper or reading end of the mercury stands at zero of the scale $d$, heat is applied until the reading end stands at zero of the scale $e$; if the instrument is reversed and this stores the amount of mercury that is above zero of the scale $d$ (or better above $c$) in the reservoir $h$, and thus the mercury left will stand at zero of $d$ (or better at the point $c$) and if the mercury is restored to its original temperature, its upper end will stand at zero of the scale $f$. In the same manner might, at the beginning of the test, any temperature be read from the scale $d$, for instance 18.3. Then, heat being applied, the mercury must be driven so high that it shows on the scale $e$ also 18.3°. If now the mercury is detached at the point $c$ and the upper part is transferred into the reservoir $h$, the mercury must fall according to the scale $f$ down to zero, if the temperature sinks down to its original point, that is to 18.3°. Theoretically spoken it would be desirable to make the detaching-point $c$ fall together with zero of the scale $d$. But this cannot be obtained in manufacturing the thermometer, nor is it necessary, as the precision-measurings are only of a relative nature.

With certain physical researches the chief thing is not to determine the real temperature of each material with accuracy to 1/100 of a degree, but great importance is attached to a relative differential precision measurement. Such cases are for example determining the rising of the boiling point or the reduction of the freezing point, if you want to determine the molecular weights or calorimetric and similar measurements. In the thermometer the scale $d$ shows the real temperature. The scale $e$ serves to adjust the mercury on the scale $f$, on which in any intervals between minus 30 degrees and plus 250 degrees C. precision measurements may be carried out. In the drawing at the scale $d$ fifths of a degree are to be read. The thread of mercury may with an accuracy of say 1/50 of a degree be detached at the point $c$, while on the scale $f$ divided into 1/50 degrees, temperature may be read with an accuracy of say hundredths of degrees. The drawing of course is nothing but an example. According to the orifice of the inner capillary tube the scale $d$ might, for instance, be graduated into tenths and the scale $f$ in hundredths, or even in thousandths, just as the examination requires it.

If the precision measurement is to be made of a temperature lying for instance above 110 degrees, and if you have only at your disposal the thermometer represented in the drawing, first heat it in order to drive the mercury thread up to forty degrees in the scale $d$, detach it—by tilting the thermometer—at the point $c$ and allow it to flow into the receptacle $h$. Repeat then this proceeding. Then heat again until the temperature reaches plus thirty degrees on the scale $e$, detach this mercury thread in the same manner as the other one and make it flow into the reservoir $h$. There are now altogether 110° (40+40+30) detached, and the thermometer, in a temperature of 110° C. registers "zero" on scale $f$, whereupon the fine-adjustment is carried out. For measurements lying just above 0° C. the thermometer is to be adjusted at the zero point of the scale $e$. For this purpose it is to be cooled in ice until on the scale $d$ the degree zero be reached. Then the thermometer is to be heated until it reaches the zero point on the scale $e$, tilted immediately and the mercury is to be run off into the upper reservoir. Then follows the desired adjustment for the precision measurement ascending from the zero point of the scale $f$. For certain purposes the range of the scale $d$ may extend over 250° C. Adjacent to this interval you find, with the necessary space between, the scale for detachment. In the same manner the scale $f$ may be graduated into a more or less great number of degrees. Each scale may be subdivided in microscopical parts of a degree as far as it be technically possible.

The instrument not alone offers the combined advantages of an absolute and a differential thermometer, but it also greatly facilitates the adjustment to zero of a differential thermometer.

What I claim is:—

1. A precision thermometer, comprising a two-part capillary tube and a reservoir, the lower part of said capillary tube having a smaller bore than the upper part and communicating with a mercury bulb and the upper part communicating with said reservoir by a tube bent twice upon itself.

2. A differential thermometer, comprising a two-part capillary tube, a mercury bulb, and a reservoir, the lower tube part communicating with said bulb and being of smaller diameter than the upper tube part, and the latter communicating with said reservoir by a tube bent twice upon itself, and a mercury break at the point where the two tube parts meet.

3. In a differential thermometer, a two-part capillary tube, the lower part being of smaller diameter than the upper part, and a mercury break in the form of a glass member having a microscopically fine longitudinal perforation, said break being located at the meeting place of said two tube parts, and its perforation in co-axial alinement therewith.

4. A differential thermometer, comprising a two-part capillary tube, the two communicating parts having different diameters, a mercury bulb communicating with the lower tube part of smaller diameter, and a reservoir communicating with the upper tube part of respectively larger diameter by a tube bent twice upon itself and three graduations, one for the real temperature at one side of the upper tube part, another at the other side of the same upper tube part, and one in combination with the lower tube part, the second said graduation being upwardly displaced relatively to the first said graduation a distance corresponding to the amount of mercury between the zero points of the first and third scales.

In testimony whereof I affix my signature in presence of two witnesses.

CARL SIEBERT.

Witnesses:
 JEAN KERKMANEY,
 JOHANNES MEYER.

Copies of this patent may be obtained for five cents each, by addressing the "Commissioner of Patents, Washington, D. C."